US010567262B1

(12) United States Patent
Mutnuru

(10) Patent No.: US 10,567,262 B1
(45) Date of Patent: Feb. 18, 2020

(54) DYNAMIC SERVER DEVICE MONITORING

(71) Applicant: Juniper Networks, Inc., Sunnyvale, CA (US)

(72) Inventor: Rishi K. Mutnuru, Santa Clara, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 87 days.

(21) Appl. No.: 15/921,181

(22) Filed: Mar. 14, 2018

(51) Int. Cl.
*H04L 29/06* (2006.01)
*H04L 12/26* (2006.01)

(52) U.S. Cl.
CPC .............. *H04L 43/16* (2013.01); *H04L 43/08* (2013.01)

(58) Field of Classification Search
CPC ....................................................... H04L 43/08
See application file for complete search history.

(56) References Cited

U.S. PATENT DOCUMENTS

| | | | |
|---|---|---|---|
| 6,278,694 B1 | 8/2001 | Wolf et al. | |
| 6,446,123 B1 | 9/2002 | Ballantine et al. | |
| 7,634,682 B2 | 12/2009 | Black et al. | |
| 8,694,627 B2 | 4/2014 | Gerber et al. | |
| 9,344,493 B1 | 5/2016 | Anand | |
| 2003/0061340 A1* | 3/2003 | Sun | H04L 43/00 709/224 |
| 2009/0177646 A1* | 7/2009 | Pham | G06F 16/24 |
| 2014/0115137 A1 | 4/2014 | Keisam | |
| 2016/0219070 A1 | 7/2016 | Vasseur et al. | |
| 2016/0315858 A1 | 10/2016 | Vytla et al. | |
| 2017/0093723 A1 | 3/2017 | Sane et al. | |

OTHER PUBLICATIONS

Alisha Cecil, "A Summary of Network Traffic Monitoring and Analysis Techniques", http://www.cse.wustl.edu/~jain/cse567-06/ftp/net_monitoring/index.html, Nov. 11, 2006, 9 pages.

* cited by examiner

*Primary Examiner* — Adnan M Mirza
(74) *Attorney, Agent, or Firm* — Harrity & Harrity, LLP

(57) ABSTRACT

A device may receive configuration information that identifies a set of server devices. The device may send, to the set of server devices, a request communication associated with determining a status of the set of server devices after receiving the configuration information. The device may process a response communication from the set of server devices after sending the request communication to the set of server devices. The request communication and the response communication may be associated with each other. The device may dynamically monitor the status of the set of server devices after processing the response communication. A first subset of the set of server devices may be monitored based on traffic from the first subset of the set of server devices. A second subset of the set of server devices may be monitored based on an additional response communication from the second subset of the set of server devices.

20 Claims, 6 Drawing Sheets

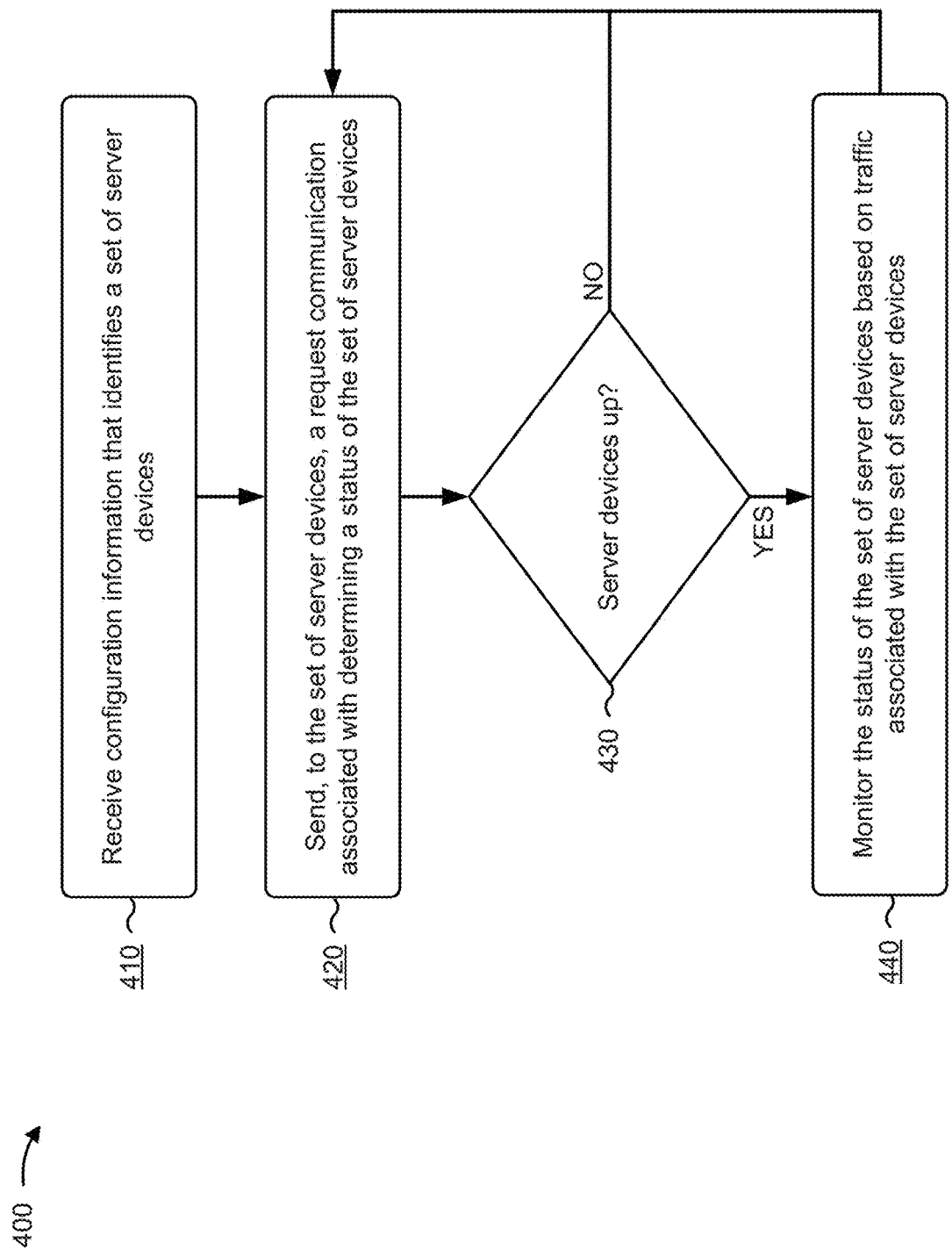

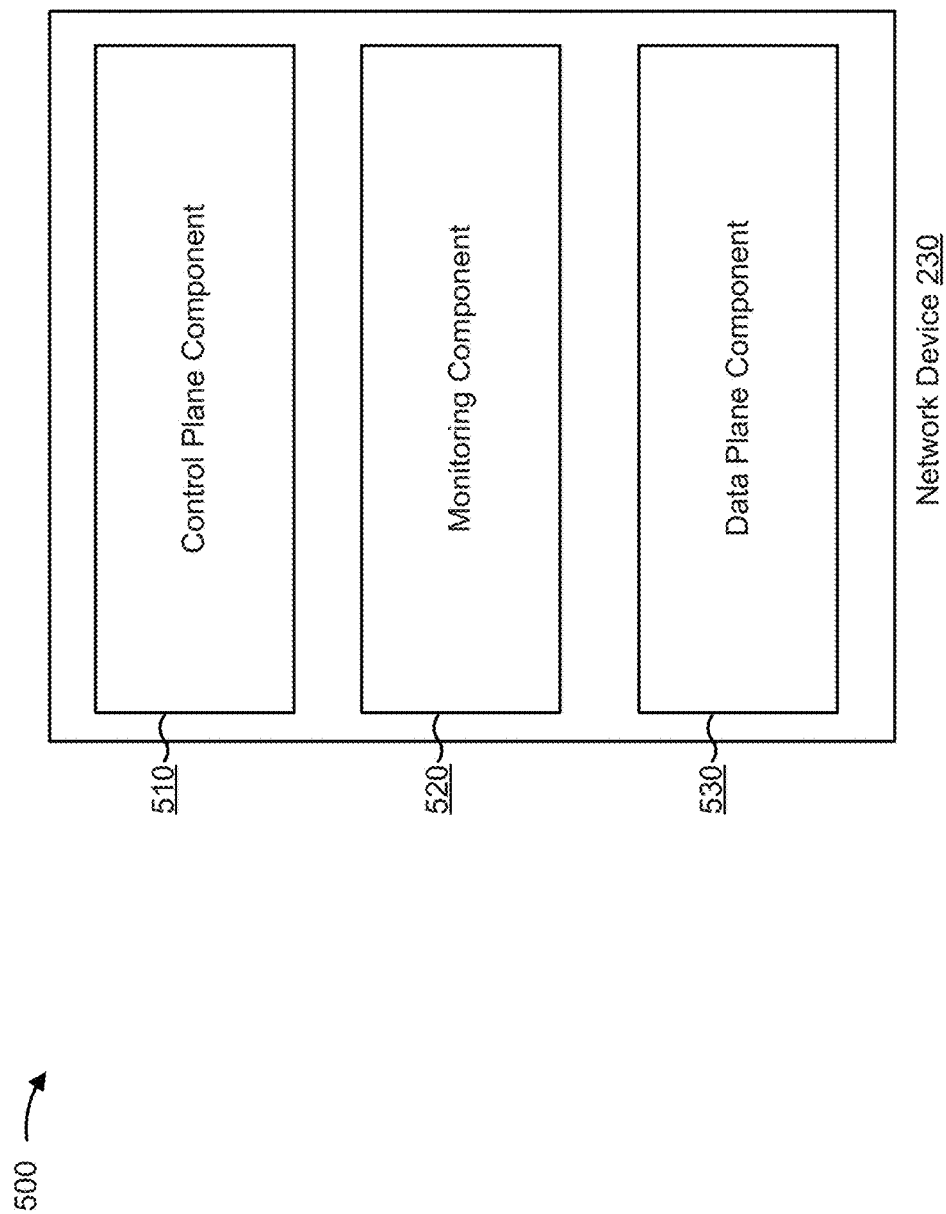

DYNAMIC SERVER DEVICE MONITORING

BACKGROUND

In a computing context, load balancing improves the distribution of workloads across multiple computing resources. Load balancing may be employed to optimize resource use, maximize throughput, minimize response time, and/or avoid overload of any single computing resource. For example, load balancing may be applied to distribute traffic among multiple server devices.

SUMMARY

According to some possible implementations, a device may comprise one or more memories, and one or more processors, communicatively coupled to the one or more memories, to receive configuration information that identifies a set of server devices. The one or more processors may send, to the set of server devices, a request communication associated with determining a status of the set of server devices after receiving the configuration information. The one or more processors may process a response communication from the set of server devices after sending the request communication to the set of server devices (e.g., where the request communication and the response communication are associated with each other). The one or more processors may dynamically monitor the status of a first subset of the set of server devices, associated with a first status, based on traffic from the first subset of the set of server devices (e.g., where the traffic and the request communication are not associated with each other), and/or a second subset of the set of server devices, associated with a second status, based on an additional response communication from the second subset of the set of server devices. The additional response communication may be received after providing an additional request communication to the second subset of the set of server devices. The additional request communication and the additional response communication may be associated with each other.

According to some possible implementations, a non-transitory computer-readable medium may store one or more instructions that, when executed by one or more processors, may cause the one or more processors to receive configuration information that identifies a set of server devices. The one or more instructions, when executed by the one or more processors, may cause the one or more processors to send, to the set of server devices, a request communication associated with determining a status of the set of server devices after receiving the configuration information. The one or more instructions, when executed by the one or more processors, may cause the one or more processors to process a response communication from the set of server devices after sending the request communication to the set of server devices. The request communication and the response communication may be associated with each other. The one or more instructions, when executed by the one or more processors, may cause the one or more processors to identify the status of the set of server devices based on a result of processing the response communication. The one or more instructions, when executed by the one or more processors, may cause the one or more processors to dynamically monitor the status of a first subset of the set of server devices, associated with a first status, based on traffic from the first subset of the set of server devices (e.g., where the traffic and the request communication are not associated with each other), or a second subset of the set of server devices, associated with a second status, based on an additional response communication from the second subset of the set of server devices. The additional response communication may be received after providing an additional request communication to the second subset of the set of server devices. The additional request communication and the additional response communication may be associated with each other.

According to some possible implementations, a method may include receiving, by a device, configuration information that identifies a set of server devices. The method may include sending, by the device and to the set of server devices, a request communication associated with determining a status of the set of server devices after receiving the configuration information. The method may include processing, by the device, a response communication from the set of server devices after sending the request communication to the set of server devices. The request communication and the response communication may be associated with each other. The method may include dynamically monitoring, by the device, the status of the set of server devices after processing the response communication. A first subset of the set of server devices may be monitored based on traffic from the first subset of the set of server devices. A second subset of the set of server devices may be monitored based on an additional response communication from the second subset of the set of server devices.

BRIEF DESCRIPTION OF THE DRAWINGS

FIG. 4 is a flow chart of an example process for dynamic server device monitoring; and FIG. 5 is a diagram of an example implementation relating to the example process shown in FIG. 4.

DETAILED DESCRIPTION

The following detailed description of example implementations refers to the accompanying drawings. The same reference numbers in different drawings may identify the same or similar elements.

As a quantity of server devices increases due to large virtual machine and virtual network function deployments, monitoring the server devices becomes increasingly difficult and can consume significant processing resources. For example, to monitor 40 thousand server instances every three seconds for two protocols, a network device would need to send 80 thousand communications every three seconds. This consumes significant computing resources (e.g., central processing unit (CPU) resources) of the network device and/or consumes significant network resources (e.g., bandwidth). In some cases, some of the communications may be dropped at the system and/or network level due to the high load of the communications. This can impede the network device's ability to monitor a health and/or status of the server devices, can cause the network device to falsely identify a server device as being down when the server device is up, and/or the like, thereby reducing a quality and/or an accuracy of monitoring the server devices.

Some implementations described herein provide a network device that is capable of dynamically modifying a manner in which a set of server devices is monitored. In this way, the network device can reduce a quantity of communications needed to monitor the set of server devices. This conserves processing resources of the network device by reducing an amount of information that the network device has to process to monitor the set of server devices. In addition, this conserves network resources by reducing a quantity of communications sent by the network device to the set of server devices related to monitoring the set of sever devices. Further, this conserves computing resources of the network device by reducing a quantity of communications sent by the network device to the set of server devices related to monitoring the set of server devices. Further, this increases an efficiency of monitoring the set of server devices by reducing or eliminating a need for the network device to communicate with all of the server devices in the set of server devices.

Figure 1A:
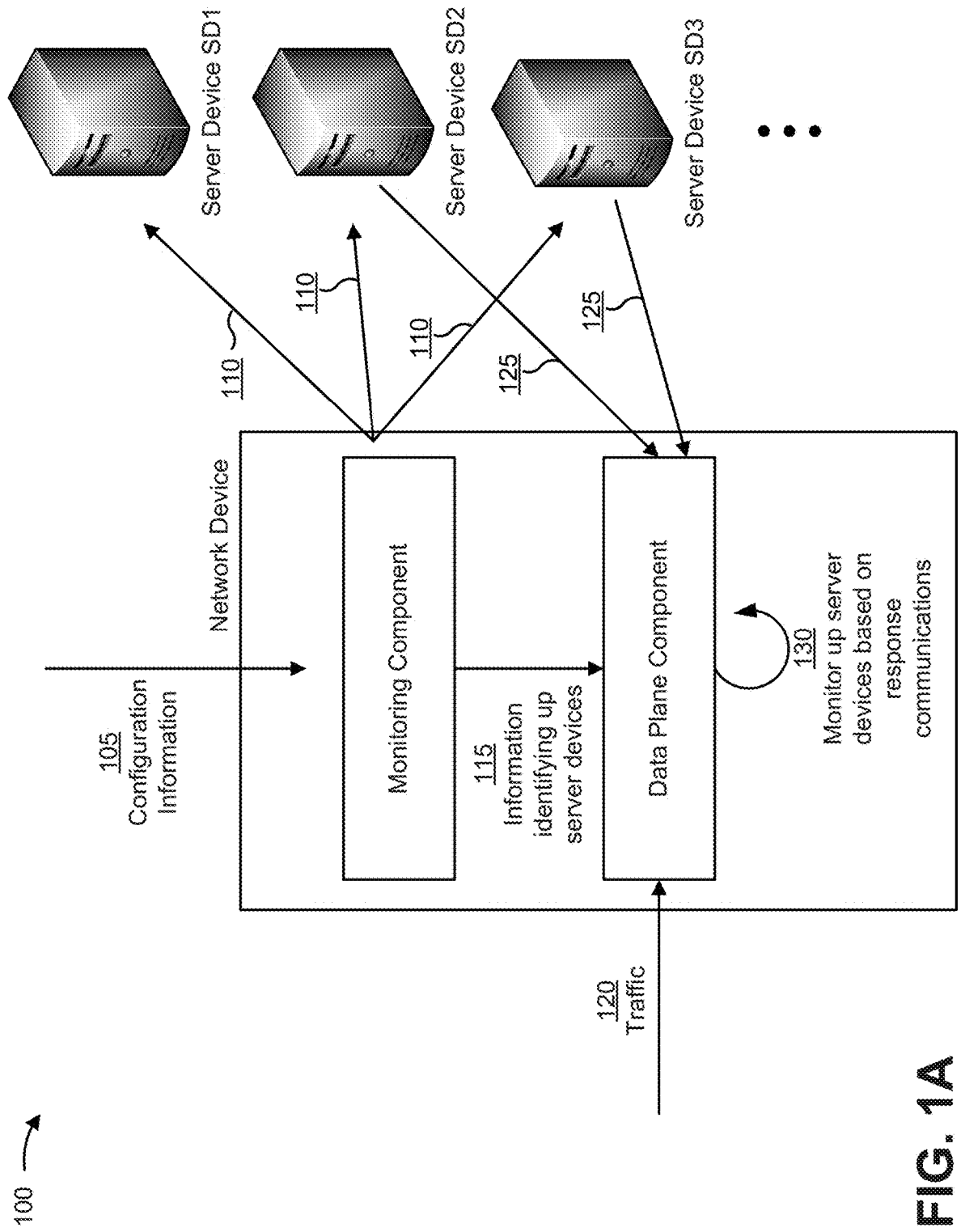
FIGS. 1A and 1B are diagrams of an overview of an example implementation described herein.
Figure 1B:
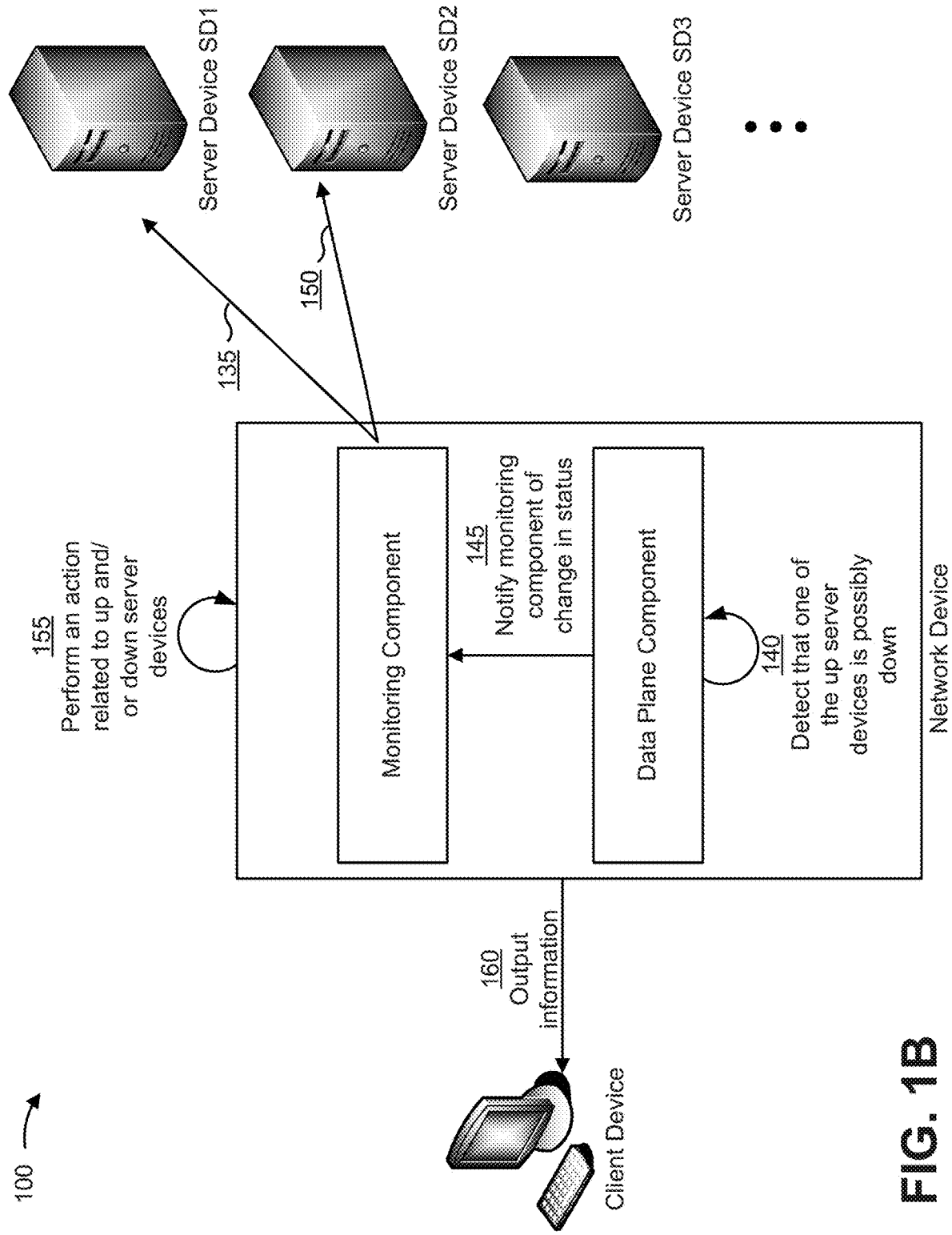

FIGS. 1A and 1B are diagrams of an overview of an example implementation 100 described herein. As shown in FIGS. 1A and 1B, example implementation 100 can include a network device (e.g., that includes a monitoring component and a data plane component), multiple server devices (e.g., shown as server devices SD1, SD2, and SD3), and a client device (not shown in FIG. 1A).

As shown in FIG. 1A, and by reference number 105, the network device can receive configuration information. For example, the monitoring component of the network device can receive the configuration information. In some implementations, the configuration information may include information that identifies a set of virtual addresses (e.g., virtual Internet protocol (IP) addresses) and a set of corresponding server devices (e.g., server devices associated with respective IP addresses). For example, and in the context of implementation 100, the configuration information may identify a virtual IP address, such as 1.1.1.0, and corresponding IP address, such as 1.1.1.1 (corresponding to server device SD1), 1.1.1.2 (corresponding to server device SD2), 1.1.1.3 (corresponding to server device SD3), and so forth. Continuing with the previous example, the virtual IP address may be externally visible outside of a network, while the IP addresses are not.

In some implementations, the configuration information may identify hundreds, thousands, or more virtual IP addresses, and hundreds, thousands, or more IP addresses corresponding to the virtual IP addresses. In this way, the configuration information may include a data set that cannot be processed manually or objectively by a human actor (e.g., in a consistent manner).

In some implementations, the network device may receive the configuration information periodically, according to a schedule, based on requesting the configuration information, as input to the client device via a command line interface, and/or the like. In some implementations, the network device may receive the configuration information from a server device associated with a third party. For example, server devices SD1 through SD3 may be associated with the same third party and the configuration information may identify server devices SD1 through SD3 as being associated with the same third party.

In some implementations, after receiving the configuration information, the network device may determine whether the configuration information satisfies one or more factors (e.g., the one or more factors, when satisfied, may be associated with a threshold likelihood that excess computing resources of the network device will be consumed while monitoring the server devices, that excess network resources will be consumed while monitoring the server devices, etc.). For example, the network device may determine whether the quantity of server devices satisfies a predefined threshold, whether a change in a quantity of server devices in the configuration information from previous configuration information satisfies a threshold, whether an amount of time since previous receipt of configuration information satisfies a threshold (e.g., based on timestamps associated with receipt of configuration information), and/or the like.

In some implementations, if the network device determines that the configuration information satisfies the one or more factors, the network device may continue to process the configuration information and/or perform one or more actions in the manner described herein. Conversely, if the network device determines that the configuration information fails to satisfy the one or more factors, then the network device may continue to monitor the configuration information until the one or more factors are satisfied, in some implementations. This conserves processing resources of the network device by reducing or eliminating a need for the network device to perform the functions described herein whenever configuration information is received. In addition, this conserves computing resources of the network device that would otherwise be consumed altering normal functioning of the network device to perform the functions described herein.

As further shown in FIG. 1A, and by reference numbers 110, the network device (using the monitoring component) may send a communication to the server devices identified by the configuration information (e.g., server devices SD1 through SD3). For example, the communication may include a request communication where the communication from the network device causes the server devices to provide a response communication. In some implementations, the network device may use the response communication (or lack thereof) to determine a status of the server devices (e.g., up, such as available or online, down, such as unavailable or offline, etc.), as described elsewhere herein.

In some implementations, the communication from the network device may be associated with one of a variety of protocols and/or server device response communications. For example, the communication may be associated with an internet control message protocol (ICMP), a transmission control protocol (TCP), a hypertext transfer protocol (HTTP), a secure sockets layer (SSL) protocol, a domain name system (DNS) protocol, a session initiation protocol (SIP), a custom protocol (e.g., custom to a third party with which a server device is associated), and/or the like. In some implementations, the network device may send a communication to a server device and may receive a corresponding response communication. For example, the network device may receive a response communication from one or more of server devices SD1 through SD3, and the network device can process the response communication to determine a status of the server device that sent the response communication.

In some implementations, the network device may determine a status of a server device based on a type of the response communication from the server device (e.g., the network device may identify a type of the response communication by processing the response communication to identify identifiers included in the response communication, metadata in a header of the response communication, and/or the like that identifies a type of the response communication). As an example, for the ICMP protocol, the network device may determine that that the status of a server device is up if the server device provides any layer 3 (e.g., layer 3 of the open source interconnection (OSI) model) traffic. Additionally, or alternatively, and as an example for the TCP protocol, the network device may determine that the status of a server device is up if the response communication from the server device does not include a reset (RST) flag. Additionally, or alternatively, and as an example for the HTTP protocol, the network device may determine that the status of a server device is up if the response communication from the server device includes a 200 (2xx) OK response code. Additionally, or alternatively, and as an example for the SSL protocol, the network device may determine that the status of a server device is up if the response communication from the server device includes an SSL handshake.

Additionally, or alternatively, and as an example for the DNS protocol, the network device may determine that the status of a server device is up if the response communication includes a DNS status code and non-zero IP addresses (e.g., for an A and/or AAAA queries), if a non-existent domain name (NXDOMAIN) response flag is not present in the response communication, if there is availability of at least one IP address for a given domain, and/or the like. Additionally, or alternatively, and as an example for a SIP protocol, the network device may determine that the status of a server device is up if the response communication from the server device includes a 200 response code. Additionally, or alternatively, and as an example for a custom protocol, the network device may parse the response communication from a server device, and may determine that the server device is up if the corresponding response communication includes an expected identifier (e.g., the network device may be configured with information that identifies communications associated with the custom protocol and corresponding statuses that can be identified based on identifiers in the communications).

In some implementations, the network device may determine that a server device is down based on a response communication from the server device. For example, if the network device receives a response communication other than one of the ones described above, the network device may determine that the server device is down. Additionally, or alternatively, the network device may determine that a server device is down based on failing to receive a response communication from the server device.

Assume for implementation 100 that the network device identifies server device SD1 as being down based on processing the response communications from server devices SD1 through SD3. In addition, assume for implementation 100 that the network device identifies server devices SD2 and SD3 as being up based on processing the response communications from server devices SD1 through SD3.

As further shown in FIG. 1A, and by reference number 115, once the network device has identified which server devices are up, the network device may send, from the monitoring component, information identifying the up server devices to the data plane component. In some implementations, the data plane component may perform load balancing with respect to the server devices. For example, assuming that server devices SD2 and SD3 are identified as being up, and that server device SD1 is identified as being down, the network device may use the data plane component to load balance traffic among server devices SD2 and SD3. Continuing with the previous example, and as shown by reference number 120, when traffic comes to the data plane component, the data plane component may load balance the traffic among server devices SD2 and SD3.

In some implementations, the data plane component may use the configuration information to load balance the traffic. For example, the network device may use the configuration information to identify particular IP addresses associated with server devices SD2 and SD3 and may provide the traffic to these IP addresses (e.g., may perform network address translation between a virtual IP address associated with server devices SD1 through SD3 and corresponding IP addresses).

As further shown in FIG. 1A, and as shown by reference numbers 125, after providing the traffic to server devices SD2 and SD3, the network device may receive, via the data plane component, response communications from server devices SD2 and SD3. For example, the response communications may be the same or similar to that described elsewhere herein (e.g., may be associated with a protocol). In some implementations, the response communications may be sent by server devices SD2 and SD3 as normal response communications to the traffic provided to server devices SD2 and SD3. In other words, the network device may not send request communications, separate from the traffic provided to server devices SD2 and SD3, to cause server devices SD2 and SD3 to provide the response communications. This conserves processing resources of the network device by reducing or eliminating a quantity of communications sent to server devices SD2 and SD3. In addition, this conserves network resources of a network between the network device and server devices SD2 and SD3, by reducing a quantity of communications provided to server devices SD2 and SD3.

As shown by reference number 130, the network device may, using the data plane component, monitor the up server devices (e.g., server devices SD2 and SD3) based on the response communications from server devices SD2 and SD3 (e.g., to identify a status change for the up server devices). For example, the data plane component may monitor response communications from server devices SD2 and SD3 to determine whether server devices SD2 and SD3 continue to remain up. In some implementations, while monitoring the up server devices (e.g., server devices SD2 and SD3), the data plane component may send a notification to the monitoring component to provide status updates for the status of the up server devices. For example, the data plane may send the notification periodically, according to a schedule, and/or the like. In some implementations, the data plane component may provide a respective status update for the up server devices. Conversely, the data plane component may provide an aggregated status update that includes aggregated information for multiple up server devices. In some implementations, if the monitoring component determines that the data plane component has not provided an expected status update, the monitoring component may send a request communication to the up server devices for which an expected status update was not received.

As shown in FIG. 1B, and by reference number 135, the network device, using the monitoring component, may continue sending request communications to server device SD1 (e.g., server devices that have been identified as down), in a manner similar to that described above with regard to reference numbers 110. For example, the monitoring component may continue to provide request communications to server devices SD1 while the data plane component load balances traffic to server devices SD2 and SD3 and/or monitors response communications from server devices SD2 and SD3. In some implementations, the network device may send request communications to server device SD1

(and other down server devices not shown in FIG. 1B) at an interval (e.g., periodically, according to a schedule, etc.).

In some implementations, the network device may detect a status change for server device SD1 (e.g., may detect that server device SD1 is now up rather than down). In this case, the monitoring component may provide information that identifies that server device SD1 is now up to the data plane component so that the data plane component can include server device SD1 in load balancing determinations. This conserves processing resources of up server devices by helping to ensure that traffic is load balanced across up server devices. Additionally, or alternatively, as the network device receives updated configuration information, the monitoring component may determine a status of newly added server devices, in a manner similar to that described elsewhere herein, and may send information identifying up server devices to the data plane component. Additionally, or alternatively, if updated configuration information does not identify a server device that was identified in previously received configuration information, the monitoring component may send a notification to the data plane component to prevent the data plane component from load balancing traffic to that server device, to prevent the data plane component from monitoring a status of that server device, and/or the like. This conserves processing resources of the network device by reducing or eliminating erroneous load balancing of traffic to that server device and/or by reducing or eliminating a need for the data plane component to monitor a status of that server device.

As shown by reference number 140, based on continuing to monitor the response communications from the up server devices as described above (e.g., from server devices SD2 and SD3), the network device, using the data plane component, may detect that one of the up server devices is possibly down (e.g., that one of server devices SD2 and SD3 is possibly down). For example, the data plane component may determine that response communications are no longer being received from a particular server device, that an unexpected response communication is received (e.g., a response communication that does not match a particular response communication for a protocol, as described above), and/or the like and may determine a previously identified up server device is possibly down. For example, for implementation 100, assume that the data plane component detects that server device SD2 is possibly down.

As further shown in FIG. 1B, and by reference number 145, based on detecting that a particular server device (e.g., server devices SD2) is possibly down, the network device, using the data plane component, may notify the monitoring component of the change in status of the particular server device. For example, if the data plane component detected that server device SD2 is possibly down, the data plane component may notify the monitoring component of the possible change in status of server device SD2 (e.g., the change from up to possibly down). In this case, and as shown by reference number 150, the network device, using the monitoring component, may send a request communication to server device SD2 to determine whether server device SD2 is actually down (e.g., in a manner similar to that described above with respect to reference numbers 110).

As further shown in FIG. 1B, and by reference number 155, the network device may perform an action related to up and/or down server devices. For example, and assuming that the monitoring component determined (e.g., based on sending the request communication as described above) that server device SD2 is up, the monitoring component can notify the data plane component to continue load balancing traffic to server device SD2. Alternatively, if the monitoring component determined that server device SD2 is down, the network device can block traffic to server device SD2 and may cause the data plane to send the traffic to a different server device such as server device SD3. For example, the monitoring component may send an instruction to the data plane component to prevent the data plane component from load balancing traffic to server device SD2.

Additionally, or alternatively, and as another example, for a previously down server device that has become up, the monitoring component can send an instruction to the data plane component to begin to load balance traffic to the previously down server device. Additionally, or alternatively, and as shown by reference number 160, the network device can output information (e.g., a report) to the client device regarding a status of a server device, a change in the status of a server device, metrics related to one or more server devices (e.g., an amount of up time for a server device, an amount of down time for a server device, a quantity of up and/or down server devices, an amount of traffic being sent to up server devices, etc.), and/or the like.

In this way, a network device can dynamically monitor a status of server devices based on traffic from the up server devices (e.g., without having to send specific request communications to the up server devices). This conserves processing resources of the network device by reducing or eliminating a need for the network device to send specific request communications to the set of up server devices to determine a status of the set of up server devices. In addition, this conserves network resources of a network between the network device and the set of up server devices by reducing a quantity of communications sent to the up server devices, by reducing or eliminating a need for the network device to send request communications to the set of up server devices to determine the status of the set of up server devices, and/or the like. Further, this conserves computing resources of the set of up server devices by reducing or eliminating a need for the set of server devices to send response communications to the network device separate from the normal response communications that the set of up server devices would send based on the network device routing traffic to the set of up server devices.

As indicated above, FIGS. 1A and 1B are provided merely as an example. Other examples are possible and may differ from what was described with regard to FIGS. 1A and 1B.

Figure 2:
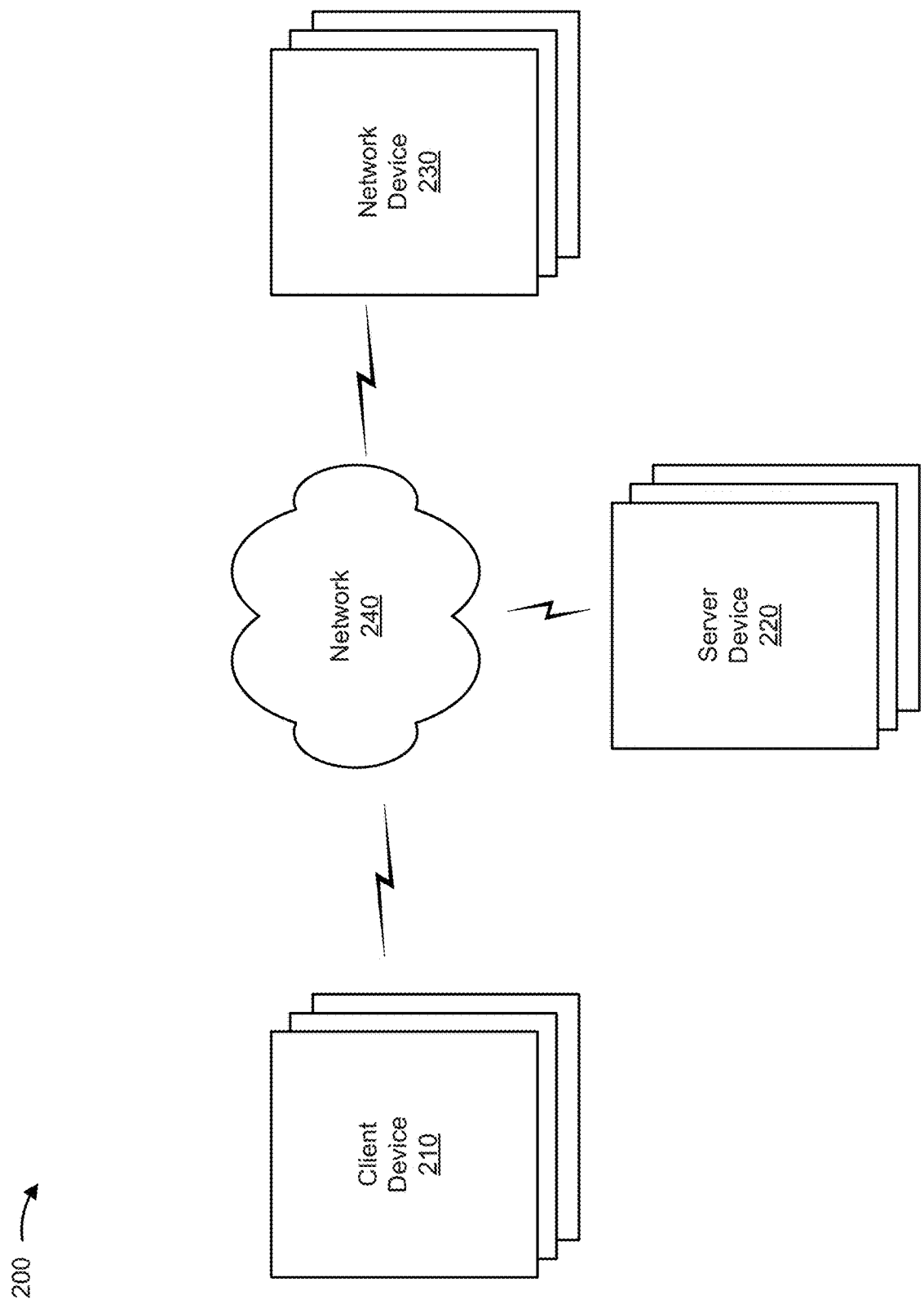
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of client devices 210 (e.g., referred to collectively as "client devices 210" and individually as "client device 210"), a set of server device 220 (e.g., referred to collectively as "server devices 220" and individually as "server device 220"), a set of network devices 230 (e.g., referred to collectively as "network devices 230" and individually as "network device 230"), and a network 240. Devices of environment 200 may interconnect via wired connections, wireless connections, or a combination of wired and wireless connections.

Client device 210 includes one or more devices capable of receiving, generating, storing, processing, and/or providing information associated with a status of server device 220. For example, client device 210 may include a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), or a similar type of device. In some implementations, client device 210 may receive a report generated by network device 230 related to a status of server device 220, as described elsewhere herein.

Server device 220 includes one or more devices capable of receiving, generating, storing, processing, and/or providing information associated with a status of server device 220. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may provide, to network device 230, a communication which network device 230 can use to determine a status of server device 220, as described elsewhere herein. Additionally, or alternatively, server device 220 may receive traffic from network device 230, as described elsewhere herein. In some implementations, server device 220 may be a physical device implemented within a housing, such as a chassis. In some implementations, server device 220 may be a virtual device implemented by one or more computer devices of a cloud computing environment or a data center.

Network device 230 includes one or more devices (e.g., one or more traffic transfer devices) capable of receiving, providing, storing, generating, and/or processing information related to a status of server device 220. For example, network device 230 may include a firewall, a router, a gateway, a switch, a hub, a bridge, a reverse proxy, a server (e.g., a proxy server), a security device, an intrusion detection device, a load balancer, or a similar device. In some implementations, network device 230 may determine a status of server device 220, as described elsewhere herein. Additionally, or alternatively, network device 230 may load balance traffic among multiple server devices 220 based on the status of the multiple server devices 220, as described elsewhere herein. In some implementations, network device 230 may be a physical device implemented within a housing, such as a chassis. In some implementations, network device 230 may be a virtual device implemented by one or more computer devices of a cloud computing environment or a data center.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of cellular network, etc.), a public land mobile network (PLMN), local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
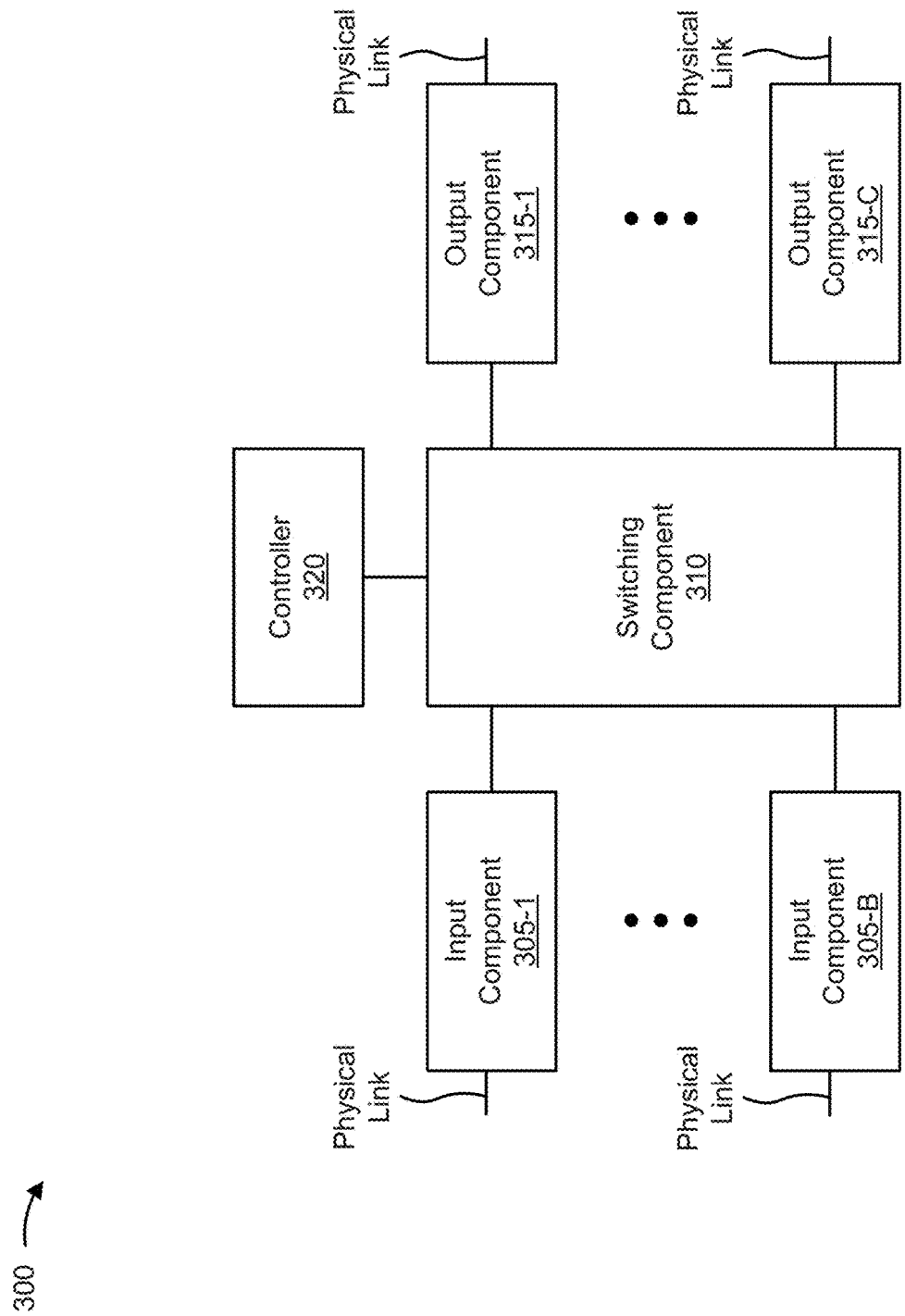
FIG. 3 is a diagram of example components of one or more devices of FIG. 2.

FIG. 3 is a diagram of example components of a device 300. Device 300 may correspond to client device 210, server device 220, and/or network device 230. In some implementations, client device 210, server device 220, and/or network device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C (C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for dynamic server device monitoring. In some implementations, one or more process blocks of FIG. 4 may be performed by a network device (e.g., network device 230). In some implementations, one or more process blocks of FIG. 4 may be performed by another device or a group of devices separate from or including the network device, such as a client device (e.g., client device 210) or a server device (e.g., server device 220).

As shown in FIG. 4, process 400 may include receiving configuration information that identifies a set of server devices (block 410). For example, the network device (e.g., using controller 320, input component 305, and/or the like) may receive configuration information that identifies a set of server devices. In some implementations, the network device may receive configuration information in a manner that is the same or similar to that described above with respect to FIGS. 1A and 1B. For example, the network device may receive the configuration information from the server device periodically, according to a schedule, based on requesting the configuration information, and/or the like.

As further shown in FIG. 4, process 400 may include sending, to the set of server devices, a request communication associated with determining a status of the set of server devices (block 420). For example, the network device (e.g., using controller 320, output component 315, switching component 310, and/or the like) may send, to the set of server devices, a request communication associated with determining a status of the set of server devices. In some implementations, the network device may send a request communication in a manner that is the same or similar to that described above with respect to FIGS. 1A and 1B. For example, the network device may send the request communication to cause the set of server devices to provide a response communication to the network device.

As further shown in FIG. 4, process 400 may include determining whether the set of server devices is up (block 430). For example, the network device (e.g., using controller 320) may determine whether the set of server devices is up (e.g., based on processing a response communication from the set of server devices, where the request communication and the response communication are associated). In some implementations, the network device may determine whether the set of server devices is up in a manner that is the same or similar to that described with respect to FIGS. 1A and 1B. For example, the network device may determine whether the set of server devices is up based on processing a response communication from the set of server devices (e.g., based on identifying the status of the set of server devices after processing the response communication).

As further shown in FIG. 4, if the network device determines that the set of server devices is not up (block 430—NO), then process 400 may include returning to block 420. For example, if the network device determines that the set of server devices is not up, then the network device (e.g., using controller 320, output component 315, switching component 310, and/or the like) may send an additional request communication to the set of server devices (e.g., to a subset of the set of server devices that is not up to cause the subset of the set of server devices to provide an additional response communication). In some implementations, the network device may send an additional request communication to the set of server devices in a manner that is the same or similar to that described with respect to FIGS. 1A and 1B. For example, the network device may send the addition request communication at an interval after sending the request communication.

As further show in FIG. 4, if the network device determines that the set of server devices is up (block 430—YES), then process 400 may include monitoring the status of the set of server devices based on traffic associated with the set of server devices (block 440). For example, if the network device determines that the set of server devices is up, then the network device (e.g., using controller 320, input component 305, and/or the like) may monitor the status of the set of server devices based on traffic associated with the set of server devices (e.g., may monitor traffic from a subset of the set of server devices that is up, where the traffic and the request communication are not associated with each other). In some implementations, the network device may monitor the status of the set of server devices based on traffic associated with the set of server devices in a manner that is the same or similar to that described with respect to FIGS. 1A and 1B. For example, the network device may monitor the status without sending an additional request communication to the set of server devices. In some implementations, process 400 may include returning to block 420 from block 440. For example, if a status of a server device changes from being up to being possibly down, the network device may send an additional request communication to the server device, in a manner similar to that described elsewhere herein.

Process 400 may include additional implementations, such as any single implementation or any combination of implementations described below.

In some implementations, the network device may identify a type of the response communication based on a result of processing the response communication and may monitor the status of a first subset of the set of server devices based on the type of a first response communication being a first type after identifying the type of the response communication, or may monitor the status of a second subset of the set of server devices based on the type of a second response communication being a second type after identifying the type of the response communication (e.g., where the first type and the second type are different). In some implementations, the network device may monitor, using a first component (e.g., a monitoring component), the first subset of the set of server devices. In some implementations, the network device may monitor, using a second component (e.g., a data plane component), the second subset of the set of server devices (e.g., the first component and the second component may be different).

In some implementations, the network device may determine that the response communication indicates a first status (e.g., up) of a first subset of the set of server devices based on the type of the response communication and may monitor a first status of the first subset of the set of server devices after determining that the response communication indicates the first status. In some implementations, the network device may determine that the response communication indicates a second status (e.g., down) of a second subset of the set of server devices based on the type of the response communication and may monitor the second status of the second subset of the set of server devices after determining that the response communication indicates the second status. In some implementations, the network device may detect a change in the status of a first subset of the set of server devices (e.g., up server devices) and/or a second subset of the set of server devices (e.g., down server devices) and may modify monitoring of a first status of the first subset of the set of server devices and/or a second status of the second subset of the set of server devices after detecting the change in the status.

In some implementations, the network device may provide information that identifies a first status of a first subset of the set of server devices (e.g., up server devices) from a first component (e.g., a data plane component) to a second component (e.g., a monitoring component), and may monitor, by the second component, the first status of the first subset of the set of server devices after providing the information from the first component to the second component. In some implementations, the network device may send additional request communications to a subset of the set of server devices (e.g., down server devices) at an interval in association with monitoring the set of server devices, may detect a change in the status of the subset of the set of server devices (e.g., a change from down to up) based on additional response communications associated with additional request communications after sending the additional request communications, and may modify monitoring of the status of the subset of the set of server devices after detecting the change in the status. In some implementations, the network device may process the traffic from a subset of the set of server devices (e.g., up server devices) in association with monitoring the set of server devices, may detect a change in the status of the subset of the set of server devices (e.g., a change from up to down) after processing the traffic, and may modify monitoring of the status of the subset of the set of server devices after detecting the change in the status.

In some implementations, the network device may update, by a first component of the device (e.g., one of the monitoring component and the data plane component), a second component of the device (e.g., the other of the monitoring component and the data plane component) of a change in the status of the set of server devices in association with monitoring the set of server devices (e.g., a change from up to down or from down to up), and may modify, by the second component, monitoring of the status of the set of server devices after updating the second component. In some implementations, the network device may receive updated configuration information in association with monitoring the status of the set of server devices, and may modify monitoring of the status of the set of server devices after receiving the updated configuration information. In some implementations, the network device may provide, from a first component of the device to a second component of the device, a set of instructions related to modifying monitoring of the status of the set of server devices after receiving updated configuration information, and may modify monitoring of the status of the set of server devices after providing the set of instructions to the second component.

In some implementations, the network device may determine that a threshold amount of time has elapsed since receiving the traffic from a subset of the set of server devices (e.g., a subset of server devices that is up) based on monitoring the status of the subset of the set of server devices, and may send another request communication to the subset of server devices after determining that the threshold amount of time has elapsed. In some implementations, the network device may generate a report related to a subset of the set of server devices (e.g., a subset of up server devices and/or a subset of down server devices) after monitoring the first subset or the second subset, and may output the report for display via another device (e.g., the client device) after generating the report. In some implementations, the response communication and/or the traffic may be associated with a protocol, such as an Internet control message protocol (ICMP), a transmission control protocol (TCP), a hypertext transfer protocol (HTTP), a secure sockets layer (SSL) protocol, a domain name system (DNS) protocol, a session initiation protocol (SIP), or a custom protocol. In some implementations, the network device may trigger an alarm based on a change in the status of the set of server devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram of an example implementation 500 relating to example process 400 shown in FIG. 4. FIG. 5 shows an example of one or more components of network device 230. As shown in FIG. 5, in example implementation 500, network device 230 can include control plane component 510, monitoring component 520, and data plane component 530.

In some implementations, control plane component 510 may receive configuration information (e.g., from server device 220). For example, control plane component 510 may receive configuration information via interaction of a user of client device 210 with a command line interface, from server device 220, and/or the like. In some implementations, control plane component 510 may generate routes and/or next hops for traffic and/or traffic translation. In this case, network device 230 may push the routes and/or next hops to data plane component 530 via a kernel of network device 230.

In some implementations, control plane component 510 may push the configuration information to monitoring component 520. In some implementations, monitoring component 520 may determine a status of server devices 220 identified in the configuration information (e.g., which server devices 220 are up and which server devices 220 are down), and may generate status information associated with the determined status (e.g., information that identifies a status of server devices 220).

In some implementations, monitoring component 520 may push the status information to data plane component 530. For example, data plane component 530 may use the status information to load balance traffic across server devices 220 that are up. In some implementations, data plane component 530 may monitor server devices 220 that are up for a possible status change (e.g., a status change from up to down, from down to up, etc.). In some implementations, data plane component 530 may notify monitoring component 520 of the possible status change so that monitoring component 520 can determine a status of the server device 220 for which there was a possible status change. In some implementations, data plane component 530 can be hardware based (e.g., stateless) or software based (e.g., stateful).

As indicated above, FIG. 5 is provided merely as an example. Other examples are possible and may differ from what was described with regard to FIG. 5.

Some implementations described herein provide network device 230 that is capable of dynamically modifying a manner in which a set of server devices 220 are monitored. In this way, network device 230 can reduce a quantity of communications needed to monitor the set of server devices 220. This conserves processing resources of network device 230 by reducing a quantity of information that network device 230 has to process to monitor the set of server devices 220. In addition, this improves functioning of network device 230 by freeing computing resources that can be used for other functions, thereby facilitating processing of larger amounts of data relative to other network devices 230. Further, this conserves computing resources of network device 230 by reducing a quantity of communications sent by network device 230 to the set of server devices 220 related to monitoring the set of server devices 220. Further, this provides a scalable way to monitor a status of a set of server devices 220.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 one or more memories; and
 one or more processors, communicatively coupled to the one or more memories, to:
   receive configuration information that identifies a set of server devices;
   send, to the set of server devices, a request communication associated with determining a status of the set of server devices after receiving the configuration information;
   process a response communication from the set of server devices after sending the request communication to the set of server devices,
     wherein the request communication and the response communication are associated with each other; and
   dynamically monitor the status,
     wherein the one or more processors, when dynamically monitoring the status, are to:
       monitor, using a first component, the status of a first subset of the set of server devices, associated with a first status, based on traffic from the first subset of the set of server devices,
         wherein the first status indicates that one or more server devices in the first subset are available, wherein the traffic and the request communication are not associated with each other, or monitor, using a second component, the status of a second subset of the set of server devices, associated with a second status, based on an additional response communication from the second subset of the set of server devices, wherein the second status indicates that one or more server devices in the second subset are not available, wherein the additional response communication is received after providing an additional request communication to the second subset of the set of server devices, and wherein the additional response communication and the additional request communication are associated with each other.

2. The device of claim 1, wherein the one or more processors are further to:

identify a type of the response communication based on a result of processing the response communication; and wherein the one or more processors, when dynamically monitoring the status, are to:

monitor the status of the first subset of the set of server devices based on the type of a first response communication being a first type after identifying the type of the response communication, or monitor the status of the second subset of the set of server devices based on the type of a second response communication being a second type after identifying the type of the response communication, wherein the first type and the second type are different.

3. The device of claim 1, wherein the one or more processors are further to:

determine that a threshold amount of time has elapsed since receiving the traffic from the first subset of the set of server devices based on monitoring the status of the first subset of the set of server devices; and send another request communication to the first subset of the set of server devices after determining that the threshold amount of time has elapsed.

4. The device of claim 1, wherein the one or more processors are further to:

generate a report related to the first subset of the set of server devices or the second subset of the set of server devices after monitoring the first status of the first subset or the second status of the second subset; and output the report for display via another device after generating the report.

5. The device of claim 1, wherein the response communication or the traffic are associated with a protocol, wherein the protocol includes at least one of:

an Internet control message protocol (ICMP), a transmission control protocol (TCP), a hypertext transfer protocol (HTTP), a secure sockets layer (SSL) protocol, a domain name system (DNS) protocol, a session initiation protocol (SIP), or a custom protocol.

6. A non-transitory computer-readable medium storing instructions, the instructions comprising:

one or more instructions that, when executed by one or more processors, cause the one or more processors to:

receive configuration information that identifies a set of server devices;

send, to the set of server devices, a request communication associated with determining a status of the set of server devices after receiving the configuration information;

process a response communication from the set of server devices after sending the request communication to the set of server devices, wherein the request communication and the response communication are associated with each other;

identify the status of the set of server devices based on a result of processing the response communication; and dynamically monitor the status, wherein the one or more instructions, that cause the one or more processors to dynamically monitor the status, cause the one or more processors to:

monitor, using a first component, the status of a first subset of the set of server devices, associated with a first status, based on traffic from the first subset of the set of server devices, wherein the first status indicates that one or more server devices in the first subset are available, wherein the traffic and the request communication are not associated with each other, or monitor, using a second component, the status of a second subset of the set of server devices, associated with a second status, based on an additional response communication from the second subset of the set of server devices, wherein the second status indicates that one or more server devices in the second subset are not available, wherein the additional response communication is received after providing an additional request communication to the second subset of the set of server devices, and wherein the additional request communication and the additional response communication are associated with each other.

7. The non-transitory computer-readable medium of claim 6, wherein the one or more instructions, when executed by the one or more processors, further cause the one or more processors to:

determine that the response communication indicates the first status of the first subset of the set of server devices based on a type of the response communication; and wherein the one or more instructions, that cause the one or more processors to monitor the status of the first subset of the set of server devices, cause the one or more processors to:

monitor the first status of the first subset of the set of server devices after determining that the response communication indicates the first status.

8. The non-transitory computer-readable medium of claim 6, wherein the one or more instructions, when executed by the one or more processors, further cause the one or more processors to:

determine that the response communication indicates the second status of the second subset of the set of server devices based on a type of the response communication; and wherein the one or more instructions, that cause the one or more processors to monitor the status of the second subset of the set of server devices, cause the one or more processors to:

monitor the second status of the second subset of the set of server devices after determining that the response communication indicates the second status.

9. The non-transitory computer-readable medium of claim 6, wherein the one or more instructions, when executed by the one or more processors, further cause the one or more processors to:
detect a change in the status of the first subset of the set of server devices or the second subset of the set of server devices; and
modify monitoring of the first status of the first subset of the set of server devices or the second status of the second subset of the set of server devices after detecting the change in the status.

10. The non-transitory computer-readable medium of claim 6, wherein the one or more instructions, when executed by the one or more processors, further cause the one or more processors to:
provide information that identifies the first status of the first subset of the set of server devices from the first component to the second component.

11. The non-transitory computer-readable medium of claim 6, wherein the one or more instructions, when executed by the one or more processors, further cause the one or more processors to:
trigger an alarm based on a change in the status of the set of server devices.

12. The non-transitory computer-readable medium of claim 6, wherein the one or more instructions, when executed by the one or more processors, further cause the one or more processors to:
determine that a threshold amount of time has elapsed since receiving the traffic from the first subset of the set of server devices while monitoring the status of the first subset of the set of server devices; and
provide, to the first subset of the set of server devices, another request communication after determining that the threshold amount of time has elapsed.

13. A method, comprising:
receiving, by a device, configuration information that identifies a set of server devices;
sending, by the device and to the set of server devices, a request communication associated with determining a status of the set of server devices after receiving the configuration information;
processing, by the device, a response communication from the set of server devices after sending the request communication to the set of server devices,
wherein the request communication and the response communication are associated with each other; and
dynamically monitoring, by the device, the status by:
monitoring, using a first component of the device, the status of a first subset of the set of server devices, associated with a first status, after processing the response communication,
wherein the first status indicates that one or more server devices in the first subset are available,
wherein the first subset of the set of server devices is monitored based/on traffic from the first subset of the set of server devices, or
monitoring, using a second component of the device, the status of a second subset of the set of server devices, associated with a second status, after processing the response communication,
wherein the second status indicates that one or more server devices in the second subset are not available, and
wherein the second subset of the set of server devices is monitored based on an additional response communication from the second subset of the set of server devices.

14. The method of claim 13, further comprising:
sending additional request communications to the second subset of the set of server devices at an interval in association with monitoring the set of server devices;
detecting a change in the status of the second subset of the set of server devices based on additional response communications associated with the additional request communications after sending the additional request communications; and
modifying monitoring of the status of the second subset of the set of server devices after detecting the change in the status.

15. The method of claim 13, further comprising:
processing the traffic from the first subset of the set of server devices in association with monitoring the set of server devices;
detecting a change in the status of the first subset of the set of server devices after processing the traffic; and
modifying monitoring of the status of the first subset of the set of server devices after detecting the change in the status.

16. The method of claim 13, further comprising:
updating, by the first component, the second component of a change in the status of the set of server devices in association with monitoring the set of server devices; and
modifying, by the second component, monitoring of the status of the set of server devices after updating the second component.

17. The method of claim 13, further comprising:
receiving updated configuration information in association with monitoring the status of the set of server devices; and
modifying monitoring of the status of the set of server devices after receiving the updated configuration information.

18. The method of claim 17, further comprising:
providing, from the first component to the second component, a set of instructions related to modifying monitoring of the status of the set of server devices after receiving the updated configuration information; and
wherein modifying, by the second component, monitoring of the status of the set of server devices comprises:
modifying monitoring of the status of the set of server devices after providing the set of instructions to the second component.

19. The device of claim 1, wherein the one or more processors are further to:
perform load balancing of the set of server devices based on one or more of:
the first status, or
the second status.

20. The device of claim 1, wherein the one or more processors are further to:
block traffic to the second subset of the set of server devices based on the second status.

\* \* \* \* \*